United States Patent [19]
Iyama

[11] Patent Number: 5,659,427
[45] Date of Patent: Aug. 19, 1997

[54] DIOPTER MOVEMENT TYPE OF FINDER OPTICAL SYSTEM FOR SINGLE-LENS REFLEX CAMERAS

[75] Inventor: Noriyuki Iyama, Hachioji, Japan

[73] Assignee: Olympus Optical Co., Ltd., Tokyo, Japan

[21] Appl. No.: 426,133

[22] Filed: Apr. 21, 1995

[30] Foreign Application Priority Data

Apr. 22, 1994  [JP]  Japan .................................. 6-084573

[51] Int. Cl.⁶ .............................. G02B 15/14; G03B 13/02
[52] U.S. Cl. ........................... 359/689; 359/686; 396/379
[58] Field of Search .................................. 359/689, 686; 396/379

[56] References Cited

U.S. PATENT DOCUMENTS

| | | | |
|---|---|---|---|
| 4,664,485 | 5/1987 | Momiyama et al. | 359/689 |
| 4,812,023 | 3/1989 | Kikuchi | 359/689 |
| 4,854,680 | 8/1989 | Kikuchi | 359/689 |

FOREIGN PATENT DOCUMENTS

| | | |
|---|---|---|
| 54-126530 | 10/1979 | Japan . |
| 60-48730 | 10/1985 | Japan . |
| 61-19969 | 5/1986 | Japan . |
| 5-181071 | 7/1993 | Japan . |

*Primary Examiner*—Scott J. Sugarman
*Attorney, Agent, or Firm*—Cushman, Darby & Cushman IP Group of Pillsbury Madison & Sutro LLP

[57] ABSTRACT

The invention is directed to a diopter movement type of finder optical system for single-lens reflex cameras, which is well corrected in terms of various aberrations such as spherical aberration and off-axis aberrations, is of resolution so high that the image can be well viewed, and has a short overall length or is compact. This finder optical system comprises, in order from the side of the eye point EP, a first lens 2 having positive refracting power, a second lens 3 having positive refracting power, a third lens 4 having negative refracting power and a pentaprism 5, with the first and second lenses 2 and 3 being moved together in the optical axis direction for diopter movement while the third lens 4 remains fixed. Moreover, the finder optical system conforms to four conditions regarding the focal lengths of the first to third lenses and the composite focal length of the first and second lenses 2 and 3.

28 Claims, 8 Drawing Sheets

DIOPTER MOVEMENT TYPE OF FINDER OPTICAL SYSTEM FOR SINGLE-LENS REFLEX CAMERAS

BACKGROUND OF THE INVENTION

1. Field of the Invention

The present invention relates generally to a finder optical system for single-lens reflex cameras, and more particularly to a finder optical system wherein a part of an eyepiece is moved in the optical axis direction of a finder for diopter movement.

2. Prior Art

In the case of finders of optical devices, binoculars, microscopes, etc., images formed by optical systems at predetermined positions are generally viewed by the eye. If the positions of the images are located outside the range of ocular accommodation ability, observation then becomes difficult. Required to observe these images is a diopter movement means for move them to a position where they are easily observable depending on ocular accommodation ability.

According to one typical diopter movement means known for the finder of a single-lens reflex camera, the eyepiece is moved back and forth with respect to the finder image.

In the finder of a conventional 35 mm single-lens reflex camera, however, the focal length $f_e$ of the eyepiece must be $f_e \geq$ about 60 mm, because of the presence of a pentaprism between the finder image and the eyepiece. This leads to a serious problem or an increase in the quantity of movement of the eyepiece required for obtaining a desired diopter change. That is, the quantity $\Delta$ of movement of an eyepiece per diopter $(m^{-1})$ is given by $$\Delta = f_e^2 / 1000$$

Here, if it is intended to obtain a diopter change of at least 2 diopters $(m^{-1})$, then the required quantity of movement of the eyepiece is about 7 mm. However, a 35 mm single-lens reflex camera cannot have a space wide-enough for such large movement, because the eyepiece must be located in a very limited space in the rear of the pentaprism.

One approach to reducing the quantity of movement is typically disclosed in JP-A 54(1979)-126530 which is directed to a diopter movement system comprising two lens units, i.e., a positive lens unit and a negative lens unit in order from the eye point side, wherein diopter movement is achieved by moving only one of these lenses while the other remains fixed. Since the focal length of the movable lens is shorter than the overall focal length of the eyepiece, some considerable diopter change is achievable by a slight movement.

For similar purposes and in order to make satisfactory correction for various aberrations, an eyepiece system comprising, in order from the eye point side, a first positive lens unit, a second positive lens unit and a third negative lens unit with the second positive lens unit taking part in diopter movement, is proposed in JP-B 60(1985)-48730. Another eyepiece system comprising, in order from the eye point side, a first positive lens unit, a second positive lens unit and a third negative lens unit with the third negative lens unit adapted for diopter movement is disclosed in JP-B 61(1986)-19969.

However, the diopter movement system disclosed in JP-A 54(1979)-126530 has the following problems. When one of the two positive and negative lenses is moved on the finder optical axis with the other remaining fixed for diopter movement, aberrations, especially off-axis aberrations such as distortion and coma cannot sufficiently be corrected in the reference state $(0\ m^{-1})$. Diopter movement, if carried out, makes aberration variations likely to become large in association with lens movement. Such aberration variations occur for the following reason.

In the case of a lens system of simple construction like an eyepiece, its overall aberrations are generally eliminated or reduced by allowing aberrations resulting from the positive lens to be offset by the negative lens. However, it is only when both the lenses are located at proper relative positions that the aberrations produced by the two lenses can be offset each other; that is, when the lenses are located at improper positions, portions of the aberrations that cannot be offset each other manifest themselves as the overall aberrations of the eyepiece. In other words, there are aberration variations incidental to the lens movement for diopter movement. Especially when it is intended to increase the eye relief (the distance from the eye point to the surface of the eyepiece proximate to the eye point side) or enhance the rate of field of view, much difficulty is involved in make sufficient correction for off-axis aberrations such as distortion and coma, because rays, when passing through the lenses, are away from the optical axis.

With the system of JP-B 60(1985)-48730 which comprises the first lens in the form of a positive lens, the second lens in the form of a positive lens and the third lens in the form of a negative lens with the second lens adapted for diopter movement or with the system of JP-B 61(1986)-19969 which comprises the first lens in the form of a positive lens, the second lens in the form of a positive lens and the third lens in the form of a negative lens with the third lens used for diopter movement, it is somehow possible to make satisfactory correction for aberrations such as distortion and coma. To make more reliable correction for aberrations, however, it is impossible to reduce the focal lengths of the lenses extremely; that is, the quantity of the lens movement for diopter movement is increased. When a wide range of diopter movement is taken in account, there must be a space allowing for such movement, resulting in an increase in the overall length of the eyepiece and so making it impossible to achieve compactness.

Still another diopter movement system is disclosed in JP-A 5(1993)-181071, which comprises a first lens in the form of a positive lens, a second lens in the form of a positive lens and a third lens in the form of a negative lens and in which the first and second lenses are moved together in the optical axis direction for diopter movement. Now, let F denote the composite focal length of the first, second and third lenses and X stand for the distance of the third lens from its image-side surface to the image surface. Then, the value of X/F is as short as about 0.25 to about 0.4. In other words, this system is well fit for an electronic view finder, but is not suitable for an optical system such as a single-lens reflex camera in which an image inverter must be located between the image surface and the eyepiece.

SUMMARY OF THE INVENTION

In view of such problems associated with the prior art, it is therefore an object of the present invention to provide a diopter movement type of finder optical system for single-lens reflex cameras, which is well corrected in terms of aberrations, typically off-axis aberrations such as distortion and coma, is of resolution so high that the image can be well viewed, and has a reduced overall length or is compact.

According to one aspect of the present invention, the object as above mentioned is achieved by the provision of a diopter movement type of finder optical system for a single-lens reflex camera which comprises, in order from the eye point side, a first lens having positive refracting power, a second lens having positive refracting power, a third lens having negative refracting power, and an optical unit including a plurality of reflecting surfaces having an image-inverting action, with said first and second lenses being moved together in the optical axis direction for diopter movement while the third lens remains fixed, and which further conforms to the following condition (1):

$$0.35 < f_{12}/f_A < 0.5 \tag{1}$$

wherein $f_{12}$ is the composite focal length of the first and second lenses, and $f_A$ is the overall focal length of the finder optical system in the reference state (0 m$^{-1}$).

According to another aspect of the present invention, there is provided a diopter movement type of finder optical system for a single-lens reflex camera which comprises, in order from the eye point side, a first lens having positive refracting power, a second lens having positive refracting power, a third lens having negative refracting power, and an optical unit including a plurality of reflecting surfaces having an image-inverting action, with said first and second lenses being moved together in the optical axis direction for diopter movement while the third lens remains fixed, and which further conforms to the following condition (2):

$$0.55 < f_1/f_A < 0.95 \tag{2}$$

wherein $f_1$ is the focal length of the first lens, and $f_A$ is the overall focal length of the finder optical system in the reference state (0 m$^{-1}$).

According to still another aspect of the present invention, there is provided a diopter movement type of finder optical system for a single-lens reflex camera which comprises, in order from the eye point side, a first lens having positive refracting power, a second lens having positive refracting power, a third lens having negative refracting power, and an optical unit including a plurality of reflecting surfaces having an image-inverting action, with said first and second lenses being moved together in the optical axis direction for diopter movement while the third lens remains fixed, and which further conforms to the following condition (3):

$$0.7 < f_2/f_A < 1.3 \tag{3}$$

wherein $f_2$ is the focal length of the second lens, and $f_A$ is the overall focal length of the finder optical system in the reference state (0 m$^{-1}$).

According to a further aspect of the present invention, there is provided a diopter movement type of finder optical system for a single-lens reflex camera which comprises, in order from the eye point side, a first lens having positive refracting power, a second lens having positive refracting power, a third lens having negative refracting power, and an optical unit including a plurality of reflecting surfaces having an image-inverting action, with said first and second lenses being moved together in the optical axis direction for diopter movement while the third lens remains fixed, and which further conforms to the following condition (4):

$$0.5 < |f_3|/f_A < 0.75 \tag{4}$$

wherein $f_3$ is the focal length of the third lens, and $f_A$ is the overall focal length of the finder optical system in the reference state (0 m$^{-1}$).

A detailed reference will now be made to why the above-mentioned arrangements are used and how they act.

Figure 1A:
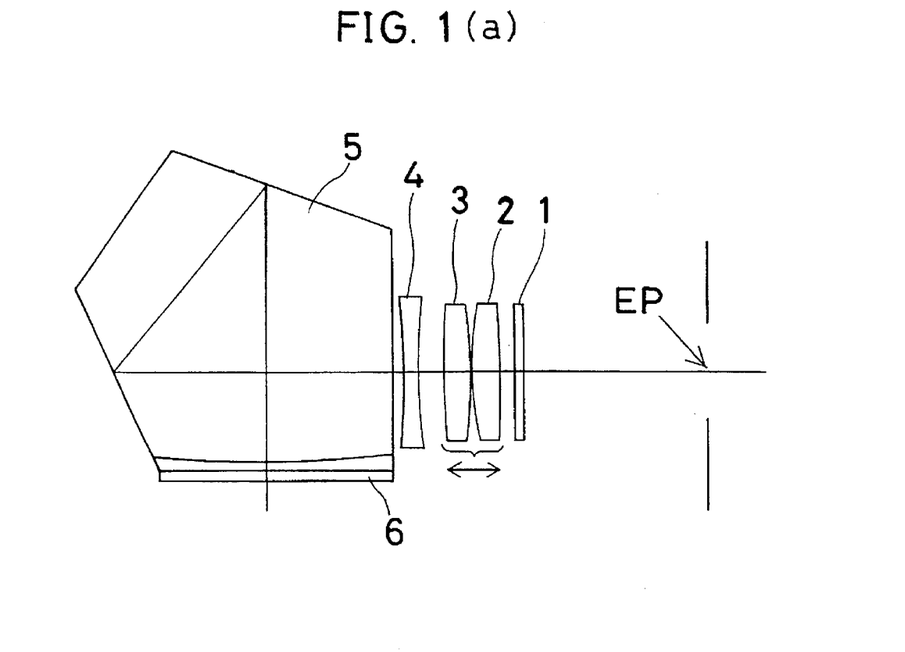
FIG. 1(a) is a sectional view of one embodiment of the diopter movement type of finder optical system for a single-lens reflex camera.
Figure 1B:
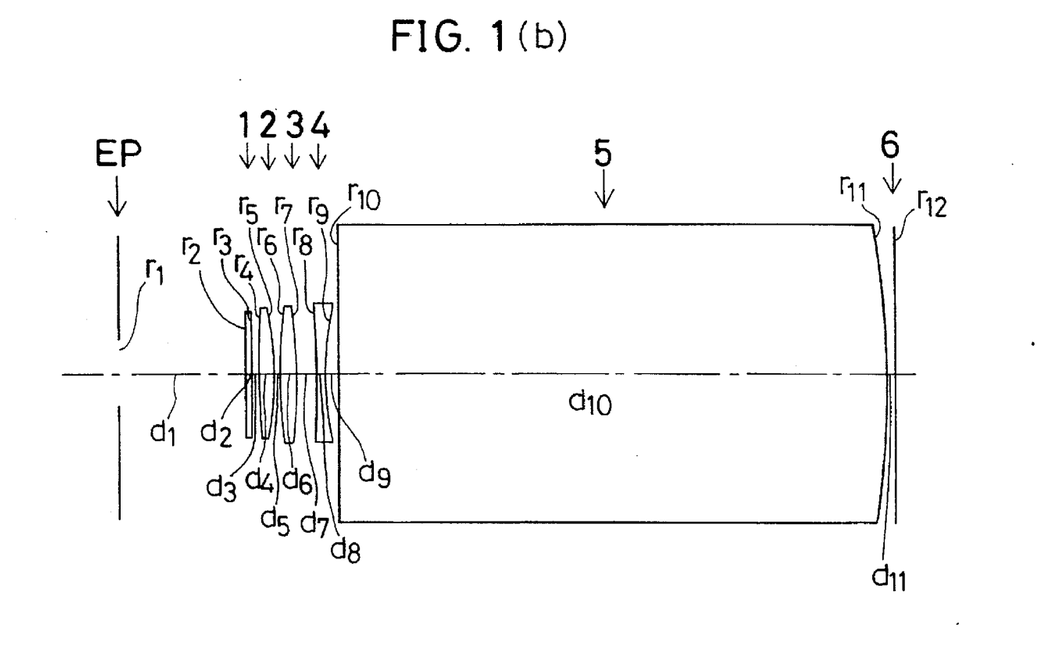
FIG. 1(b) is an equivalent optical path diagram for inverse tracing.

FIG. 1(a) is a sectional view of one embodiment of the diopter movement type of finder optical system for a single-lens reflex camera according to the present invention, and FIG. 1(b) is an equivalent optical path diagram for inverse tracing, in which rays are shown to propagate from an eye point EP to an eyepiece. As illustrated, the finder optical system comprises, in order from the side of an eye point EP, a first lens 2 having positive refracting power, a second lens 3 having positive refracting power, a third lens 4 having negative refracting power, and an optical unit including a plurality of reflecting surfaces having an image-inverting action, for instance, a pentamirror, typically a pentaprism 5, with said first and second lenses 2 and 3 being moved together in the optical axis direction for diopter movement while the third lens 4 remains fixed, and conforms to the following conditions (1) to (4):

$$0.35 < f_{12}/f_A < 0.5 \tag{1}$$
$$0.55 < f_1/f_A < 0.95 \tag{2}$$
$$0.7 < f_2/f_A < 1.3 \tag{3}$$
$$0.5 < |f_3|/f_A < 0.75 \tag{4}$$

Here $f_{12}$ is the composite focal length of the first and second lenses, $f_1$ is the focal length of the first lens, $f_2$ is the focal length of the second lens, $f_3$ is the focal length of the third lens, and $f_A$ is the overall focal length of the finder optical length in the reference state (0 m$^{-1}$).

That is, the finder optical system according to the present invention is constructed from, in order from the side of the eye point EP, the first lens 2 having positive refracting power, the second lens 3 having positive refracting power, the third lens 4 having negative refracting power, and the pentaprism 5. For diopter movement, the first and second lenses 2 and 3 are moved together in the optical axis direction while the third lens 4 remains fixed. Moreover, the finder optical system conforms to Conditions (1) to (4) above mentioned.

With the eyepiece of such construction, it is possible to reduce off-axis aberrations, especially distortions and comas ascribable to the first and second positive lenses 2 and 3, and to make well-balanced correction for those aberrations. Especially when it is intended to increase the eye relief or enhance the rate of field of view, this eyepiece is effective for correction for aberrations due to increased ray heights of rays passing through the lenses.

In the present invention, diopter movement occurs by moving the first and second lenses 2 and 3 together in the optical axis direction while the third lens 4 remains fixed. It is thus possible to make the focal lengths of the lens units moved for diopter movement shorter than would be possible with one single lens. It is consequently possible to reduce the quantity of movement of the lenses and so reduce the overall length of the eyepiece. Moreover, aberration variations incidental to diopter movement are reduced.

A detailed account will now be given of what is implied by Conditions (1) to (4).

Condition (1) is to define the proportion of the composite focal length of the first and second lenses 2 and 3 with respect to the overall focal length of the finder optical system in the reference state. When the lower limit of 0.35 is not reached, coma is under-corrected. When the upper limit of 0.5 is exceeded, on the other hand, the quantity of movement of the first and second lenses 2 and 3 for diopter movement is increased, resulting in the need of increasing the overall length of the eyepiece and so failing to achieve compactness. There are also increased aberration variations incidental to diopter movement.

Condition (2) is to define the proportion of the focal length of the first lens 2 with respect to the overall focal length of the finder optical system in the reference state. When the lower limit of 0.55 is not reached, coma is under-corrected. When the upper limit of 0.95 is exceeded, on the other hand, the composite focal length of the first and second lenses 2 and 3 is so increased that the quantity of movement of the first and second lenses 2 and 3 for diopter movement is increased, resulting in the need of increasing the overall length of the eyepiece and so failing to achieve compactness. There are also increased aberration variations incidental to diopter movement.

Condition (3) is to define the proportion of the focal length of the second lens 3 with respect to the overall focal length of the finder optical system in the reference state. When the lower limit of 0.7 is not reached, spherical aberration and coma are under-corrected. When the upper limit of 1.3 is exceeded, on the other hand, the composite focal length of the first and second lenses 2 and 3 is so increased that the quantity of movement of the first and second lenses 2 and 3 for diopter movement is increased, resulting in the need of increasing the overall length of the eyepiece and so failing to achieve compactness. There are also increased aberration variations incidental to diopter movement.

Condition (4) is to define the proportion of the focal length of the third lens 4 with respect to the overall focal length of the finder optical system in the reference state. When the lower limit of 0.5 is not reached, spherical aberration is under-corrected. When the upper limit of 0.75 is exceeded, on the other hand, the composite focal length of the first and second lenses 2 and 3 is so increased that the quantity of movement of the first and second lenses 2 and 3 for diopter movement is increased, resulting in the need of increasing the overall length of the eyepiece and so failing to achieve compactness. There are also increased aberration variations incidental to diopter movement.

In the present invention, it is particularly desired that the above-mentioned conditions (1) to (4) reduce to the following conditions (1)' to (4)', because spherical aberrations and comas can be better corrected with the eyepiece made more compact.

$$0.375 < f_{12}/f_A < 0.45 \quad (1)'$$

$$0.55 < f_1/f_A < 0.85 \quad (2)'$$

$$0.75 < f_2/f_A < 1.25 \quad (3)'$$

$$0.5 < |f_3|/f_A < 0.75 \quad (4)'$$

According to the foregoing, the object of the present invention is achievable. By conforming to Conditions (5) to (7) as given below, it is possible to make well correction for coma in particular. It is also possible to place the air separation between adjacent lenses under proper control, regulate proper separations in the vicinity of the maximum effective diameter of each lens, and provide easy processing of lenses.

Moreover, the finder optical system of the present invention should preferably conform to the following conditions (5), (6) and (7):

$$0.4 < SF1 < 0.9 \quad (5)$$

$$-0.7 < SF2 < 0.6 \quad (6)$$

$$-0.8 < SF3 < 0.8 \quad (7)$$

wherein SF1, SF2 and SF3 are the shape factors of the first, second and third lenses 2, 3 and 4, respectively. It is here to be noted that the shape factor SF is defined by $$SF = (RE+RS)/(RE-RS)$$

where RE is the radius of curvature of each lens located on the side of the eye point EP and RS is the radius of curvature of each lens located on the side of a finder screen 6.

A detailed account will now be given of what is implied by Conditions (5), (6) and (7) as mentioned just above.

Conditions (5)–(7) are to define the shapes of the respective lenses. Referring first to Condition (5), when the lower limit of 0.4 is not reached, astigmatism is under-corrected. When the upper limit of 0.9 is exceeded, on the other hand, the front focal position of the composite system consisting of the first and second lenses 2 and 3 is shifted toward the eye point EP. This makes large diopter movement difficult even when the first and second lenses 2 and 3 are moved together toward the third lens 4 for diopter movement.

Referring then to Condition (6), when the lower limit of −0.7 is not reached, the front focal position of the composite system consisting of the first and second lenses 2 and 3 is shifted toward the eye point EP. This makes large diopter movement difficult even when the first and second lenses 2 and 3 are moved together toward the third lens 4 for diopter movement. Upon the upper limit of 0.6 exceeded, on the other hand, spherical aberration and coma are under-corrected.

Referring finally to Condition (7), when the lower limit of −0.8 is not reached, coma is under-corrected. Upon the upper limit of 0.8 exceeded, on the other hand, the radius of curvature of the third lens 4 located on the side of the screen 6 is reduced. To prevent interference between the third lens 4 and the pentaprism 5 in the vicinity of its maximum effective diameter, it is then required that the third lens 4 be spaced away from the pentaprism 5, so failing to achieve compactness.

To correct spherical aberration and coma and make the range of diopter movement wide, it is particularly preferred that one or more of Conditions (5)–(7) reduce to $$0.5 < SF1 < 0.85 \quad (5)'$$

$$-0.66 < SF2 < 0.6 \quad (6)'$$

$$-0.6 < SF3 < 0.4 \quad (7)'$$

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The present invention will now be explained in further detail with reference to Examples 1 to 5 of the diopter movement type of finder optical system for a single-lens reflex camera.

According to the examples referred to below, the object of the present invention is achieved by the provision of a finder optical system for single-lens reflex cameras, which consists of, in order from the side of the eye point EP, a first lens 2 which is in a double-convex form and has positive refracting power, a second lens 3 which is in a double-convex form and has positive refracting power, and a third lens 4 which is in a double-concave form and has negative refracting power, and a pentaprism 5, as in the case of FIG. 1(b). For diopter movement, the first and second lenses 2 and 3 are moved together in the optical axis direction while the third lens 4 remains fixed. This finder optical system should conform to the above-mentioned conditions (1) to (7). All these are the characteristic features of the present invention. In FIGS. 1(a) and 1(b), reference numeral 1 stands for a cover glass. FIG. 1(b) illustrates in section the lens arrangement of Example 1 in the reference state. It is here to be noted that lens arrangements of other examples, because of being substantially identical in construction with that of Example 1, are not illustrated. For Example 2, however, see FIG. 2.

Numerical data on each example will be given later. In Example 1, the second lens 3 is gentler in the radius of curvature on the side of a finder screen 6 than on the side of the eye point EP, while the third lens 4 is gentler in the radius of curvature on the side of the eye point EP than on the side of the finder screen 6. By allowing the first and second lenses 2 and 3 to have such shapes it is possible to reduce spherical aberration and coma to a very low level.

Figure 2:
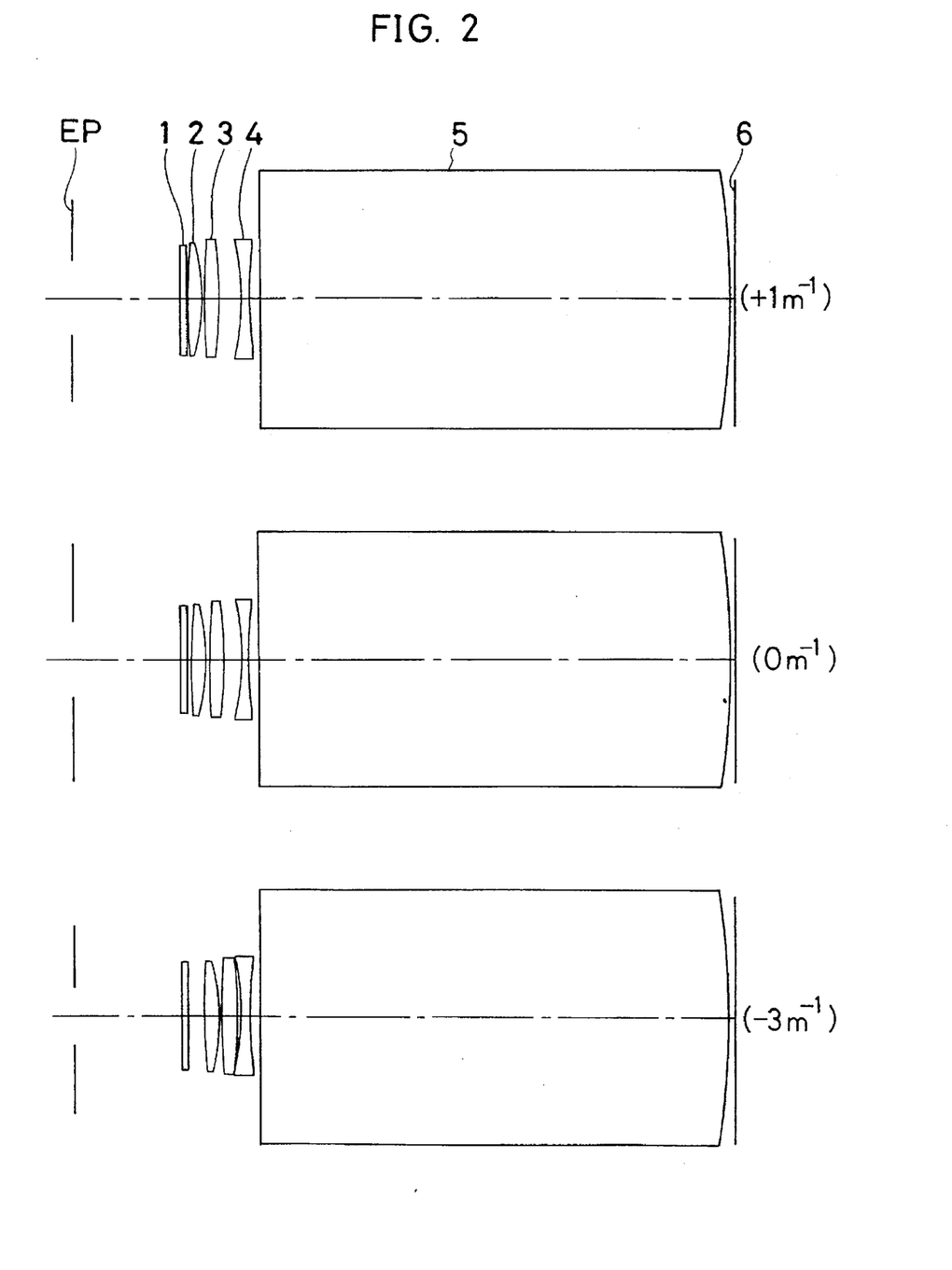
FIG. 2 is a sectional view of the lens arrangement of Example 2 at diopters of +1 m$^{-1}$, 0 m$^{-1}$ and −3 m$^{-1}$.

In Example 2, the second lens 3 is gentler in the radius of curvature on the side of the eye point EP than on the side of the finder screen 6, while the third lens 4 is gentler in the radius of curvature on the side of the finder screen 6 than on the side of the eye point EP. By permitting the second and third lenses 3 and 4 to have such shapes, it is easy to process lenses because the separation between the third lens 4 and the pentaprism 5 can be made wide at the maximum effective diameter of the lens 4.

In Example 3, the proportion of the composite focal length of the first and second lenses 2 and 3 with respect to the overall focal length of the finder optical system is made relatively small, so that the quantity of movement of the first and second lenses 2 and 3 incidental to diopter movement is reduced, thereby reducing aberration variations.

In Example 4, the surface of the pentaprism 5 located on the side of the finder screen 6 is made so aspheric that distortion in particular can be well corrected. At a position near the optical axis the system is convex on the side of the finder screen 6, while at a position far away from the optical axis the system is concave on the side of the finder screen 6. This enables distortion to be well corrected.

Throughout the above-mentioned Examples 1 to 4, the surface of the pentaprism 5 on the side of the finder screen 6 is convex on the side of the finder screen 6. This makes it possible to reduce a change in the composite focal length of the eyepiece and pentaprism 5 due to the movement of the first and second lenses 2 and 3 for diopter movement and, hence, a change in the finder magnification incidental to diopter movement, so making viewing through the finder easy.

In Example 5, the surface of the pentaprism 5 on the side of the finder screen 6 is so planar that the pentaprism 5 can be easily processed.

To provide an illustration of how the first and second lenses 2 and 3 are moved for diopter movement, lens arrangements of Example 2 at diopters of +1 m⁻¹, 0 m⁻¹ and −3 m⁻¹ are shown in section in FIG. 2.

Set out below are the numerical data on the respective examples. The symbols hereinafter used but hereinbefore not have the following meanings.

$r_1, r_2, \ldots$ the radii of curvature of the respective lens surfaces as indicated in order from the side of the eye point EP.

$d_1, d_2, \ldots$ the separations between the respective lens surfaces as indicated in order from the side of the eye point EP.

$n_{d1}, n_{d2}, \ldots$ the d-line indices of refraction of the respective lenses as indicated in order from the side of the eye point EP.

$v_{d1}, v_{d2}, \ldots$ the Abbe's number of the respective lenses as indicated in order from the side of the eye point EP.

It is here to be noted that r1 represents the position of the eye point EP, and r12 represents the finder screen 6. Let x denote the direction reverse to the direction of propagation of light on the optical axis and y indicate the direction perpendicular to the optical axis. Then, aspheric shape is given by $$x=(y^2/r)/\{1+\{1-P(y/r)^2\}^{1/2}\}+A_4y^4+A_6y^6+A_8y^8$$

where r is the paraxial radius of curvature, P is the conical coefficient, and $A_4$, $A_6$ and $A_8$ are the aspherical coefficients.

| Example 1 | | | |
|---|---|---|---|
| $r_1 = \infty$ | $d_1 = 18.000$ | | |
| $r_2 = \infty$ | $d_2 = 0.848$ | $n_{d1} = 1.51633$ | $v_{d1} = 64.15$ |
| $r_3 = \infty$ | $d_3 =$ (Variable) | | |
| $r_4 = 257.6481$ | $d_4 = 2.304$ | $n_{d2} = 1.71300$ | $v_{d2} = 53.84$ |
| $r_5 = -46.7471$ | $d_5 = 0.434$ | | |
| $r_6 = 68.1349$ | $d_6 = 2.766$ | $n_{d3} = 1.71300$ | $v_{d3} = 53.84$ |
| $r_7 = -98.2429$ | $d_7 =$ (Variable) | | |
| $r_8 = -99.6740$ | $d_8 = 1.267$ | $n_{d4} = 1.72825$ | $v_{d4} = 28.46$ |
| $r_9 = 42.7452$ | $d_9 = 1.500$ | | |
| $r_{10} = \infty$ | $d_{10} = 79.611$ | $n_{d5} = 1.51633$ | $v_{d5} = 64.15$ |
| $r_{11} = -140.0000$ | $d_{11} = 0.670$ | | |
| $r_{12} = \infty$ | | | |

Spaces for Diopter Movement

| | $+1\ m^{-1}$ | $0\ m^{-1}$ | $-3\ m^{-1}$ |
|---|---|---|---|
| $d_3$ | 0.202 | 1.018 | 3.415 |
| $d_7$ | 3.682 | 2.866 | 0.469 |

$f_A = 66.45$, $f_{12} = 28.45$, $f_1 = 55.67$, $f_2 = 56.82$, $f_3 = -40.93$, $f_{12}/f_A = 0.428$, $f_1/f_A = 0.838$, $f_2/f_A = 0.855$, $|f_3|/f_A = 0.616$, SF1 = 0.693, SF2 = −0.181, SF3 = 0.399

| Example 2 | | | |
|---|---|---|---|
| $r_1 = \infty$ | $d_1 = 18.000$ | | |
| $r_2 = \infty$ | $d_2 = 0.848$ | $n_{d1} = 1.51633$ | $v_{d1} = 64.15$ |
| $r_3 = \infty$ | $d_3 =$ (Variable) | | |
| $r_4 = 293.4015$ | $d_4 = 2.314$ | $n_{d2} = 1.77250$ | $v_{d2} = 49.66$ |
| $r_5 = -34.9388$ | $d_5 = 0.345$ | | |
| $r_6 = 238.3142$ | $d_6 = 2.774$ | $n_{d3} = 1.61700$ | $v_{d3} = 62.79$ |
| $r_7 = -64.3068$ | $d_7 =$ (Variable) | | |
| $r_8 = -38.3329$ | $d_8 = 1.275$ | $n_{d4} = 1.72825$ | $v_{d4} = 28.46$ |
| $r_9 = 112.6511$ | $d_9 = 1.500$ | | |
| $r_{10} = \infty$ | $d_{10} = 79.611$ | $n_{d5} = 1.51633$ | $v_{d5} = 64.15$ |
| $r_{11} = -140.0000$ | $d_{11} = 0.670$ | | |
| $r_{12} = \infty$ | | | |

Spaces for Diopter Movement

| | $+1\ m^{-1}$ | $0\ m^{-1}$ | $-3\ m^{-1}$ |
|---|---|---|---|
| $d_3$ | 0.307 | 1.073 | 3.331 |
| $d_7$ | 3.639 | 2.873 | 0.615 |

$f_A = 66.34$, $f_{12} = 27.58$, $f_1 = 40.54$, $f_2 = 82.37$, $f_3 = -39.13$, $f_{12}/f_A = 0.416$, $f_1/f_A = 0.611$, $f_2/f_A = 1.242$, $|f_3|/f_A = 0.589$, SF1 = 0.787, SF2 = 0.575, SF3 = −0.492

| Example 3 | | | |
|---|---|---|---|
| $r_1 = \infty$ | $d_1 = 18.000$ | | |
| $r_2 = \infty$ | $d_2 = 0.848$ | $n_{d1} = 1.51633$ | $v_{d1} = 64.15$ |
| $r_3 = \infty$ | $d_3 =$ (Variable) | | |
| $r_4 = 515.6449$ | $d_4 = 2.352$ | $n_{d2} = 1.77250$ | $v_{d2} = 49.66$ |
| $r_5 = -42.8702$ | $d_5 = 0.335$ | | |
| $r_6 = 95.4829$ | $d_6 = 2.775$ | $n_{d3} = 1.61700$ | $v_{d3} = 62.79$ |
| $r_7 = -47.2298$ | $d_7 =$ (Variable) | | |
| $r_8 = -42.6556$ | $d_8 = 1.279$ | $n_{d4} = 1.72825$ | $v_{d4} = 28.46$ |
| $r_9 = 67.3869$ | $d_9 = 1.500$ | | |
| $r_{10} = \infty$ | $d_{10} = 79.611$ | $n_{d5} = 1.51633$ | $v_{d5} = 64.15$ |
| $r_{11} = -140.0000$ | $d_{11} = 0.670$ | | |
| $r_{12} = \infty$ | | | |

Spaces for Diopter Movement

| | $+1\ m^{-1}$ | $0\ m^{-1}$ | $-3\ m^{-1}$ |
|---|---|---|---|
| $d_3$ | 0.427 | 1.114 | 3.150 |
| $d_7$ | 3.490 | 2.803 | 0.766 |

$f_A = 66.33$, $f_{12} = 26.14$, $f_1 = 51.33$, $f_2 = 51.20$, $f_3 = -35.69$, $f_{12}/f_A = 0.394$, $f_1/f_A = 0.774$, $f_2/f_A = 0.778$, $|f_3|/f_A = 0.538$, SF1 = 0.846, SF2 = 0.338, SF3 = −0.225

| Example 4 | | | |
|---|---|---|---|
| $r_1 = \infty$ | $d_1 = 18.000$ | | |
| $r_2 = \infty$ | $d_2 = 0.848$ | $n_{d1} = 1.51633$ | $v_{d1} = 64.15$ |
| $r_3 = \infty$ | $d_3 =$ (Variable) | | |
| $r_4 = 161.8529$ | $d_4 = 2.304$ | $n_{d2} = 1.71300$ | vd2 = 53.84 |
| $r_5 = -48.7911$ | $d_5 = 0.434$ | | |
| $r_6 = 71.5895$ | $d_6 = 2.766$ | $n_{d3} = 1.71300$ | vd3 = 53.84 |
| $r_7 = -81.6048$ | $d_7 =$ (Variable) | | |
| $r_8 = -76.7085$ | $d_8 = 1.266$ | $n_{d4} = 1.72825$ | vd4 = 28.46 |
| $r_9 = 41.6869$ | $d_9 = 1.500$ | | |
| $r_{10} = \infty$ | $d_{10} = 80.087$ | $n_{d5} = 1.52540$ | vd5 = 56.25 |
| $r_{11} = -109.8589$ (Aspheric) | $d_{11} = 0.670$ | | |
| $r_{12} = \infty$ | | | |

Aspherical Coefficients

11th surface $P = 1.0000$
$A_4 = 0.40706 \times 10^{-5}$
$A_6 = 0.15046 \times 10^{-7}$
$A_8 = 0.53401 \times 10^{-12}$ Spaces for Diopter Movement

| | $+1\ m^{-1}$ | $0\ m^{-1}$ | $-3\ m^{-1}$ |
|---|---|---|---|
| $d_3$ | 0.280 | 1.017 | 3.193 |
| $d_7$ | 3.603 | 2.866 | 0.690 |

$f_A = 67.097$, $f_{12} = 27.057$, $f_1 = 52.82$, $f_2 = 53.89$, $f_3 = -36.92$, $f_{12}/f_A = 0.403$, $f_1/f_A = 0.787$, $f_2/f_A = 0.803$, $|f_3|/f_A = 0.550$, SF1 = 0.537, SF2 = −0.654, SF3 = 0.296

| Example 5 | | | |
|---|---|---|---|
| r1 = $\infty$ | $d_1 = 18.000$ | | |
| r2 = $\infty$ | $d_2 = -0.848$ | $n_{d1} = 1.51633$ | $v_{d1} = 64.15$ |
| r3 = $\infty$ | $d_3 =$ (Variable) | | |
| r4 = 463.3046 | $d_4 = 2.313$ | $n_{d2} = 1.77250$ | $v_{d2} = 49.66$ |
| r5 = −44.4589 | $d_5 = 0.346$ | | |
| r6 = 88.3836 | $d_6 = 2.774$ | $n_{d3} = 1.61700$ | $v_{d3} = 62.79$ |
| r7 = −52.3338 | $d_7 =$ (Variable) | | |
| r8 = −48.6134 | $d_8 = 1.275$ | $n_{d4} = 1.72825$ | $v_{d4} = 28.46$ |
| r9 = 63.2638 | $d_9 = 1.500$ | | |
| r10 = $\infty$ | $d_{10} = 79.611$ | $n_{d5} = 1.51633$ | $v_{d5} = 64.15$ |
| r11 = $\infty$ | $d_{11} = 0.670$ | | |
| r12 = $\infty$ | | | |

-continued

Spaces for Diopter Movement

| | +1 m$^{-1}$ | 0 m$^{-1}$ | −3 m$^{-1}$ |
|---|---|---|---|
| d$_3$ | 0.340 | 1.072 | 3.234 |
| d$_7$ | 3.605 | 2.874 | 0.711 | f$_A$ = 66.501, f$_{12}$ = 26.963, f$_1$ = 52.617, f$_2$ = 53.679, f$_3$ = −37.567, f$_{12}$/f$_A$ = 0.405, f$_1$/f$_A$ = 0.791, f$_2$/f$_A$ = 0.807, |f$_3$|/f$_A$ = 0.565, SF1 = 0.825, SF2 = 0.256, SF3 = 0.131

Figures 3A, 3B, 3C:
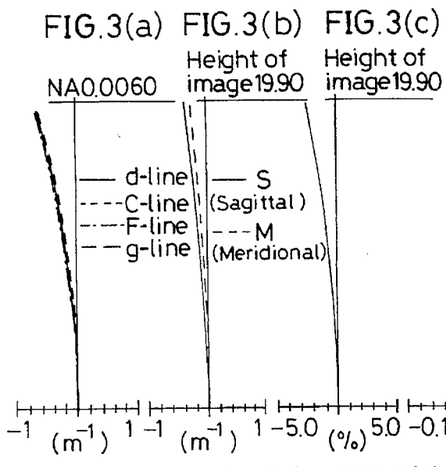
FIG. 3 is an aberration diagram of Example 1 regulated to a diopter of +1 m$^{-1}$, with (a), (b), (c) and (d) representing spherical aberration, astigmatism, distortion and chromatic aberration of magnification, respectively.
Figure 3D:
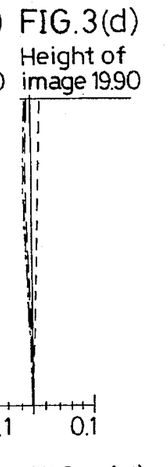
Figure 4A:
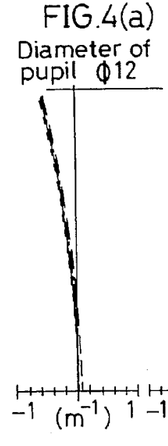
FIG. 4 is an aberration diagram of Example 1 regulated to a diopter of 0 m$^{-1}$, with (a), (b), (c) and (d) representing spherical aberration, astigmatism, distortion and chromatic aberration of magnification, respectively.
Figures 4B, 4C, 4D:
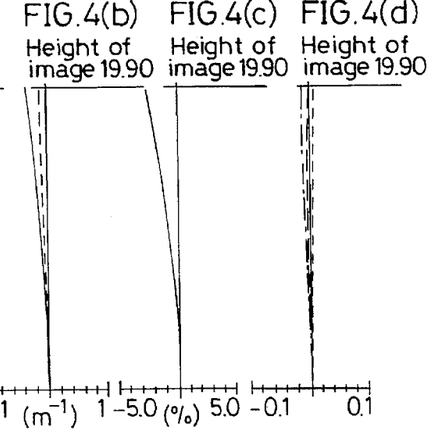
Figure 5A:
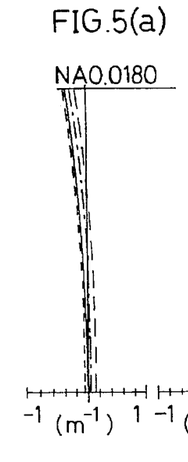
FIG. 5 is an aberration diagram of Example 1 regulated to a diopter of −3 m⁻¹, with (a), (b), (c) and (d) representing spherical aberration, astigmatism, distortion and chromatic aberration of magnification, respectively.
Figures 5B, 5C, 5D:
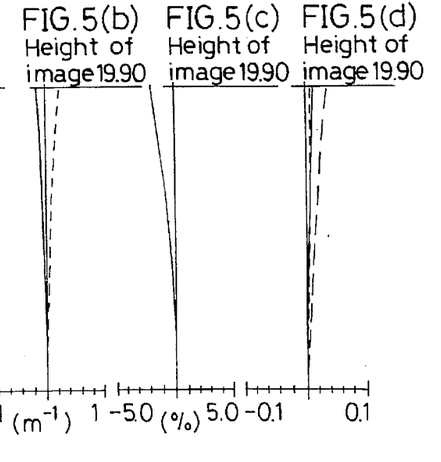
Figures 6A, 6B, 6C:
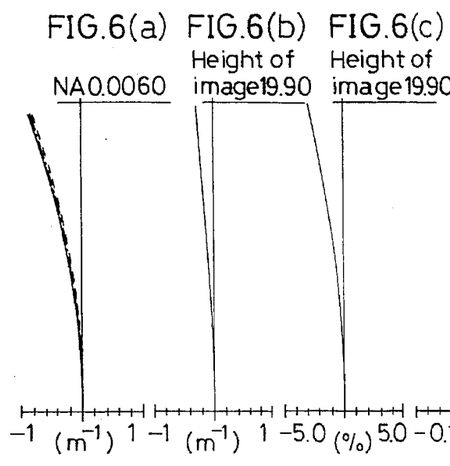
FIG. 6 is an aberration diagram of Example 2, which is similar to FIG. 3.
Figure 6D:
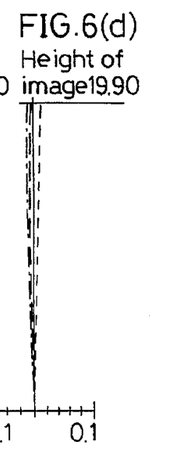
Figures 7A, 7B, 7C, 7D:
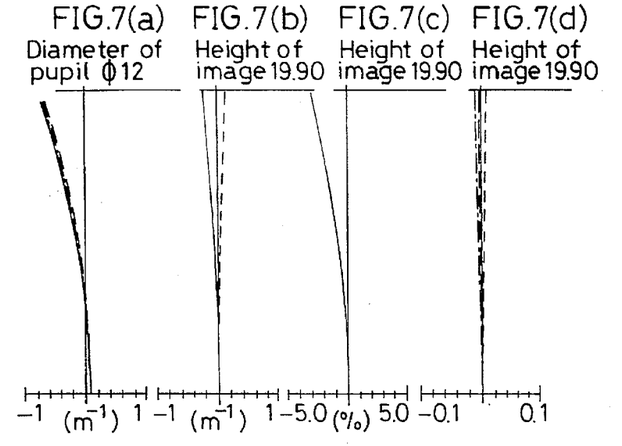
FIG. 7 is an aberration diagram of Example 2, which is similar to FIG. 4.
Figures 8A, 8B, 8C, 8D:
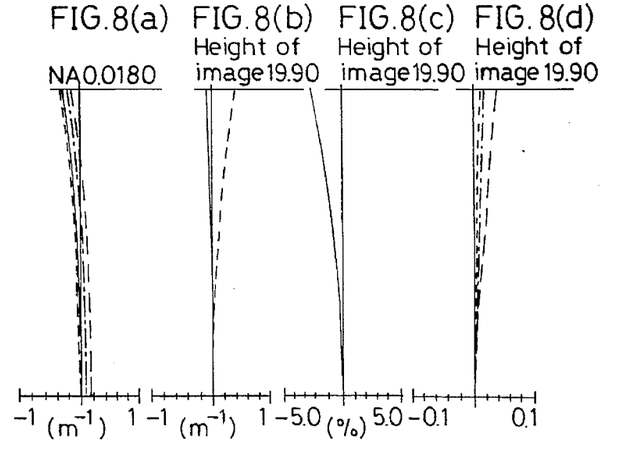
FIG. 8 is an aberration diagram of Example 2, which is similar to FIG. 5.
Figures 9A, 9B, 9C, 9D:
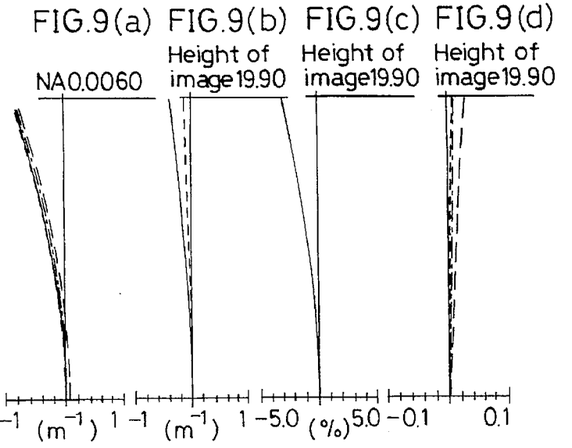
FIG. 9 is an aberration diagram of Example 3, which is similar to FIG. 3.
Figures 10A, 10B, 10C, 10D:
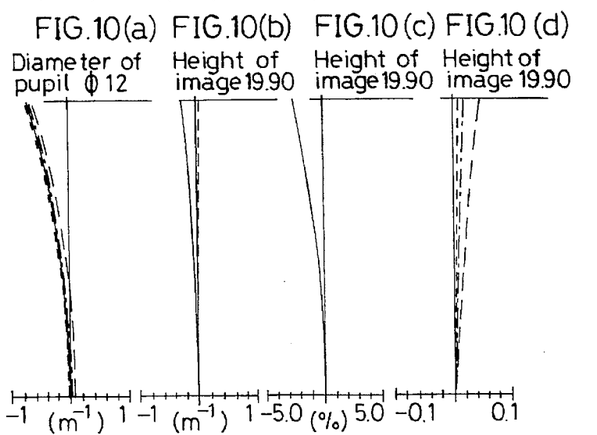
FIG. 10 is an aberration diagram of Example 3, which is similar to FIG. 4.
Figures 11A, 11B, 11C, 11D:
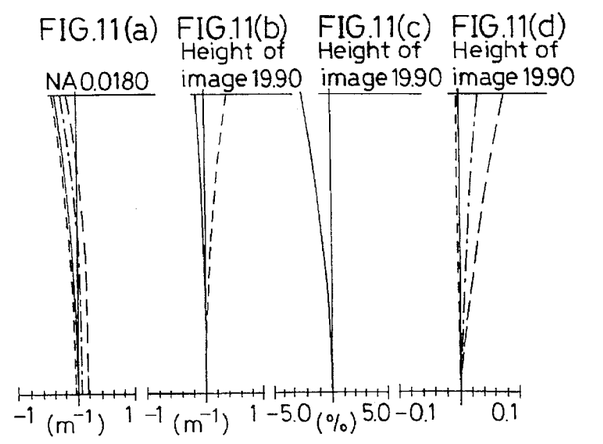
FIG. 11 is an aberration diagram of Example 3, which is similar to FIG. 5.
Figures 12A, 12B, 12C, 12D:
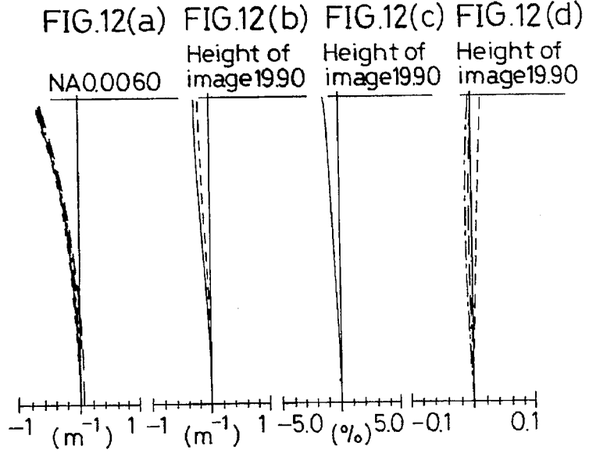
FIG. 12 is an aberration diagram of Example 4, which is similar to FIG. 3.
Figures 13A, 13B, 13C, 13D:
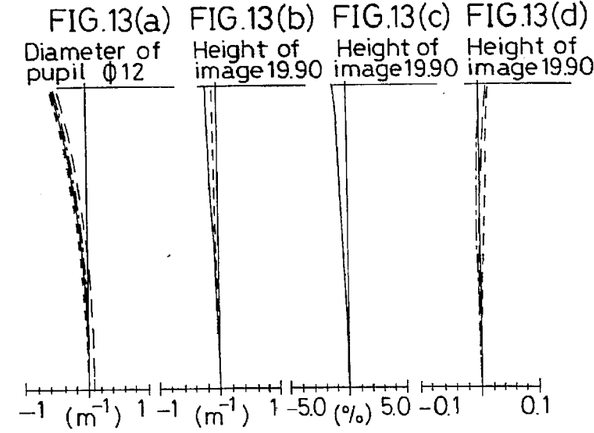
FIG. 13 is an aberration diagram of Example 4, which is similar to FIG. 4.
Figures 14A, 14B, 14C, 14D:
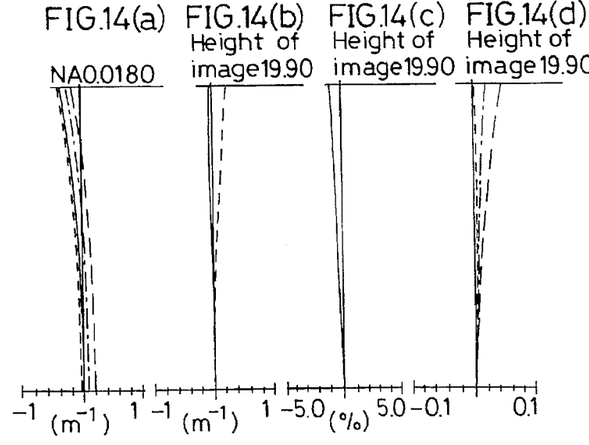
FIG. 14 is an aberration diagram of Example 4, which is similar to FIG. 5.
Figure 15A:
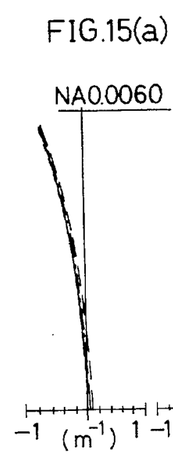
FIG. 15 is an aberration diagram of Example 5, which is similar to FIG. 3.
Figure 15B:
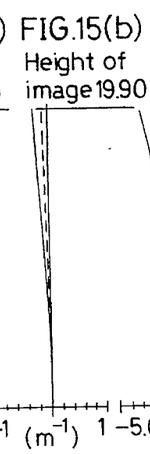
Figure 15C:
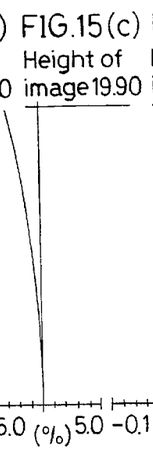
Figure 15D:
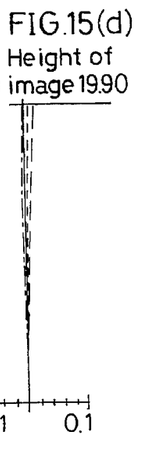
Figure 16A:
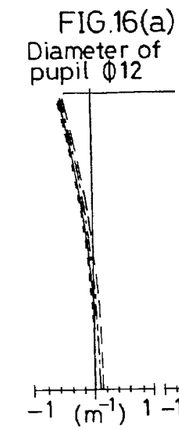
FIG. 16 is an aberration diagram of Example 5, which is similar to FIG. 4.
Figure 16B:
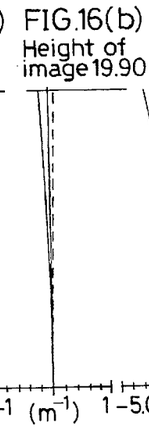
Figure 16C:
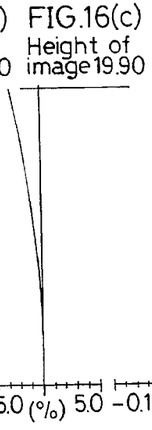
Figure 16D:
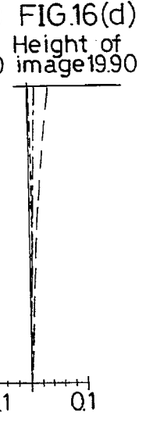
Figure 17A:
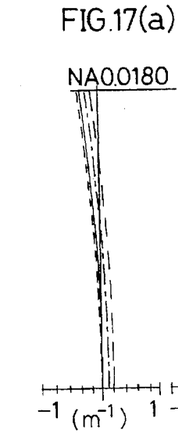
FIG. 17 is an aberration diagram of Example 5, which is similar to FIG. 5.
Figure 17B:
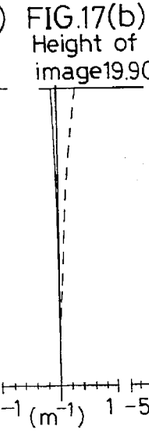
Figure 17C:
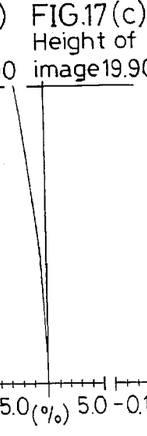
Figure 17D:
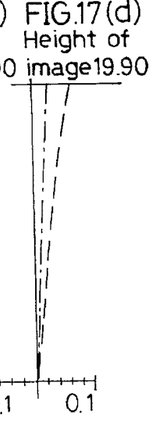

Aberration diagrams of Example 1 with the diopter regulated to +1 m$^{-1}$, 0 m$^{-1}$ and −3 m$^{-1}$ are attached hereto as FIGS. 3 to 5, wherein (a), (b), (c) and (d) represent spherical aberration, astigmatism, distortion and chromatic aberration of magnification. Aberration diagrams of Example 2, similar to FIGS. 3–5, are attached hereto as FIGS. 6–8; aberration diagrams of Example 3 as FIGS. 9–11; aberration diagrams of Example 4 as FIGS. 12–14; and aberration diagrams of Example 5 as FIGS. 15–17.

Figure 18:
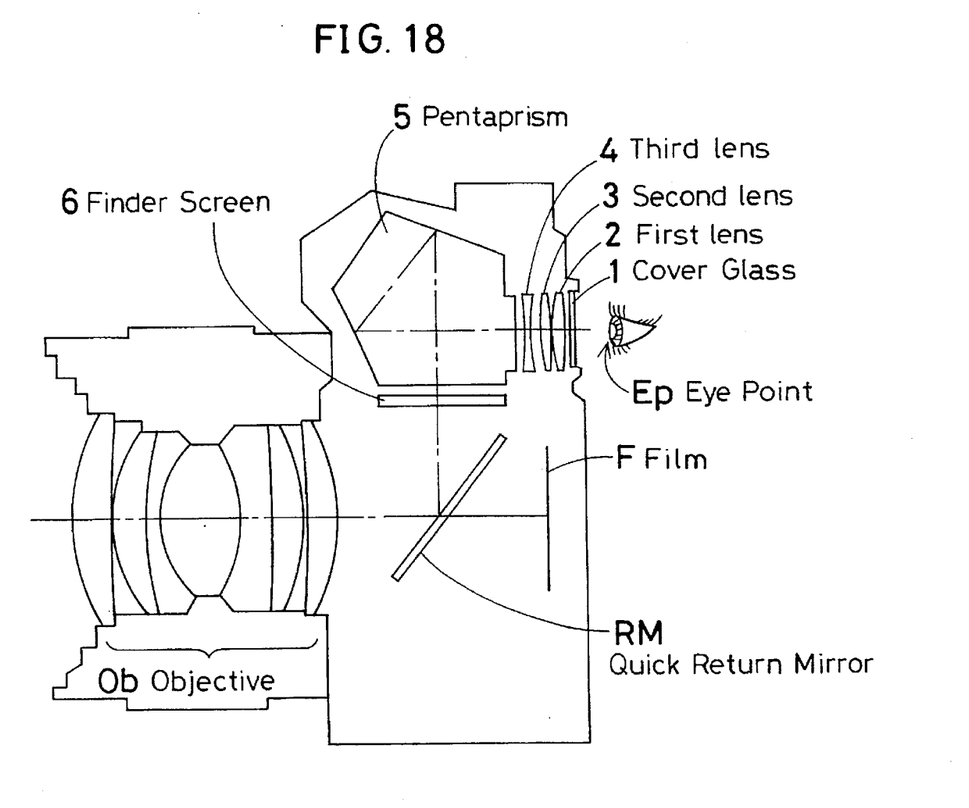
FIG. 18 is a schematic of a single-lens reflex camera with the finder optical system of the present invention built in it.

The present finder optical system such as one explained in each example may be built in a single-lens reflex camera, a schematic structure of which is shown in FIG. 18. A single-lens reflex camera is generally designed such that light coming from the subject through an objective Ob is guided onto film F on which the image of the subject is formed. Between the objective Ob and the film F there is located a retractable quick return mirror RM. While the camera is held for good support and good shooting, the image of the subject is formed on a finder screen 6 through the quick return mirror RM inserted in the optical path and the objective Ob. The image of the subject formed on the finder screen 6 is magnified by the finder optical system of the present invention for viewing at the position of the eye point EP. Depending on the diopter of the viewer's eye, the first and second lenses 2 and 3 are then moved along the optical axis of the finder optical system, so that the image of the subject can be viewed at the position best suited for the viewer.

According to the present invention as explained in detail, it is possible to achieve a diopter movement type of finder optical system for single-lens reflex cameras, which is well corrected in terms of various off-axis aberrations such as distortion and coma so that the image of the subject can be well viewed, and has a reduced overall length or is compact.

What is claimed is:

1. A diopter movement type of finder optical system for single-lens reflex cameras, comprising, in order from an eye point side:

a first lens having positive refracting power;
    a second lens having positive refracting power;
    a third lens having negative refracting power; and
    an optical unit including a plurality of reflecting surfaces having an image-inverting action;
    said first lens and said second lens being moved together in an optical axis direction for diopter movement while said third lens remains fixed; and
    said finder optical system conforming to the following condition (1):

$$0.35 < f_{12}/f_A < 0.5 \quad (1)$$

wherein f$_{12}$ is a composite focal length of said first lens and said second lens, and f$_A$ is an overall focal length of said finder optical system in a reference state (0 m$^{-1}$).

2. The diopter movement type of finder optical system for single-lens reflex cameras according to claim 1, which further conforms to the following condition (2):

$$0.55 < f_1/f_A < 0.95 \quad (2)$$

wherein f$_1$ is a focal length of said first lens.

3. The diopter movement type of finder optical system for single-lens reflex cameras according to claim 1, which further conforms to the following condition (3):

$$0.7 < f_2/f_A < 1.3 \quad (3)$$

wherein f$_2$ is a focal length of said second lens.

4. The diopter movement type of finder optical system for single-lens reflex cameras according to claim 1, which further conforms to the following condition (4):

$$0.5 < |f_3|/f_A < 0.75 \quad (4)$$

wherein f$_3$ is a focal length of said third lens.

5. The diopter movement type of finder optical system for single-lens reflex cameras according to claim 1, which further conforms to the following conditions (2) and (3):

$$0.55 < f_1/f_A < 0.95 \quad (2)$$

$$0.7 < f_2/f_A < 1.3 \quad (3)$$

wherein f$_1$ is a focal length of said first lens and f$_2$ is a focal length of said second lens.

6. The diopter movement type of finder optical system for single-lens reflex cameras according to claim 1, which further conforms to the following conditions (3) and (4):

$$0.7 < f_2/f_A < 1.3 \quad (3)$$

$$0.5 < |f_3|/f_A < 0.75 \quad (4)$$

wherein f$_2$ is a focal length of said second lens and f$_3$ is a focal length of said third lens.

7. The diopter movement type of finder optical system for single-lens reflex cameras according to 1, which further conforms to the following conditions (2) and (4):

$$0.55 < f_1/f_A < 0.95 \quad (2)$$

$$0.5 < |f_3|/f_A < 0.75 \quad (4)$$

wherein f$_1$ is a focal length of said first lens and f$_3$ is a focal length of said third lens.

8. The diopter movement type of finder optical system for single-lens reflex cameras according to claim 1, which further conforms to the following conditions (2), (3) and (4):

$$0.55 < f_1/f_A < 0.95 \quad (2)$$

$$0.7 < f_2/f_A < 1.3 \quad (3)$$

$$0.5 < |f_3|/f_A < 0.75 \quad (4)$$

wherein f$_1$ is a focal length of said first lens, f$_2$ is a focal length of said second lens, and f$_3$ is a focal length of said third lens.

9. The diopter movement type of finder optical system for single-lens reflex cameras according to any one of claims 1, 2, 3, 4, 5, 6, 7, or 8, which further conforms to the following condition (1)':

$$0.375 < f_{12}/f_A < 0.45 \quad (1)'.$$

10. A diopter movement type of finder optical system for single-lens reflex cameras, comprising, in order from an eye point side:

a first lens having positive refracting power;
    a second lens having positive refracting power;

a third lens having negative refracting power; and an optical unit including a plurality of reflecting surfaces having an image-inverting action;

said first lens and said second lens being moved together in an optical axis direction for diopter movement while said third lens remains fixed; and said finder optical system conforming to the following condition (2):

$$0.55 < f_1/f_A < 0.95 \qquad (2)$$

wherein $f_1$ is a focal length of said first lens, and $f_A$ is an overall focal length of said finder optical system in a reference state (0 m$^{-1}$).

11. The diopter movement type of finder optical system for single-lens reflex cameras according to claim 10, which further conforms to the following condition (3):

$$0.7 < f_2/f_A < 1.3 \qquad (3)$$

wherein $f_2$ is a focal length of said second lens.

12. The diopter movement type of finder optical system for single-lens reflex cameras according to claim 10, which further conforms to the following condition (4):

$$0.5 < |f_3|/f_A < 0.75 \qquad (4)$$

wherein $f_3$ is a focal length of said third lens.

13. The diopter movement type of finder optical system for single-lens reflex cameras according to claim 10, which further conforms to the following conditions (3) and (4):

$$0.7 < f_2/f_A < 1.3 \qquad (3)$$

$$0.5 < |f_3|/f_A < 0.75 \qquad (4)$$

wherein $f_2$ is a focal length of said second lens and $f_3$ is a focal length of said third lens.

14. The diopter movement type of finder optical system for single-lens reflex cameras according to any one of claims 10, 2, 5, 7, 8, 11, 12 or 13, which further conforms to the following condition (2)':

$$0.55 < f_1/f_A < 0.85 \qquad (2)'.$$

15. A diopter movement type of finder optical system for single-lens reflex cameras, comprising, in order from an eye point side:

a first lens having positive refracting power;

a second lens having positive refracting power;

a third lens having negative refracting power; and an optical unit including a plurality of reflecting surfaces having an image-inverting action;

said first lens and said second lens being moved together in an optical axis direction for diopter movement while said third lens remains fixed; and said finder optical system conforming to the following condition (3):

$$0.7 < f_2/f_A < 1.3 \qquad (3)$$

wherein $f_2$ is a focal length of said second lens, and $f_A$ is an overall focal length of said finder optical system in a reference state (0 m$^{-1}$).

16. The diopter movement type of finder optical system for single-lens reflex cameras according to claim 15, which further conforms to the following condition (4):

$$0.5 < |f_3|/f_A < 0.75 \qquad (4)$$

wherein $f_3$ is a focal length of said third lens.

17. The diopter movement type of finder optical system for single-lens reflex cameras according to any one of claims 15, 3, 5, 6, 8, 11, 13 or 16, which further conforms to the following condition (3)':

$$0.75 < f_2/f_A < 1.25 \qquad (3)'.$$

18. A diopter movement type of finder optical system for single-lens reflex cameras, comprising, in order from an eye point side:

a first lens having positive refracting power;

a second lens having positive refracting power;

a third lens having negative refracting power; and an optical unit including a plurality of reflecting surfaces having an image-inverting action;

said first lens and said second lens being moved together in an optical axis direction for diopter movement while said third lens remains fixed; and said finder optical system conforming to the following condition (4):

$$0.5 < |f_3|/f_A < 0.75 \qquad (4)$$

wherein $f_3$ is a focal length of said third lens, and $f_A$ is an overall focal length of said finder optical system in a reference state (0 m$^{-1}$).

19. The diopter movement type of finder optical system for single-lens reflex cameras according to any one of claims 1–8, 10–15 and 18, which further conforms to the following condition (5):

$$0.4 < SF1 < 0.9 \qquad (5)$$

wherein SF1 is a shape factor defined by $$SF = (RE+RS)/(RE-RS)$$

where RE is a radius of curvature of a surface of a first lens located on said eye point side, and RS is a radius of curvature of a surface of a first lens located on a finder screen side.

20. The diopter movement type of finder optical system for single-lens reflex cameras according to any one of claims 1–8, 10–15 and 18, which further conforms to the following condition (6):

$$-0.7 < SF2 < 0.6 \qquad (6)$$

wherein SF2 is a shape factor defined by $$SF = (RE+RS)/(RE-RS)$$

where RE is a radius of curvature of a surface of a second lens located on said eye point side, and RS is a radius of curvature of a surface of a second lens located on a finder screen side.

21. The diopter movement type of finder optical system for single-lens reflex cameras according to any one of claims 1–8, 10–15 and 18, which further conforms to the following condition (7):

$$-0.8 < SF3 < 0.8 \qquad (7)$$

wherein SF3 is a shape factor defined by $$SF=(RE+RS)/(RE-RS)$$

where RE is a radius of curvature of a surface of a third lens located on said eye point side, and RS is a radius of curvature of a surface of a third lens located on a finder screen side.

22. The diopter movement type of finder optical system for single-lens reflex cameras according to any one of claims 18, 4, 6, 7, 8, 12, 13, or 16, which further conforms to the following condition (4)':

$$0.5<|f_3|/f_A<0.7 \qquad (4)'.$$

23. The diopter movement type of finder optical system for single-lens reflex cameras according to claim 19, which further conforms to the following condition (5)':

$$0.5<SF1<0.85 \qquad (5)'.$$

24. The diopter movement type of finder optical system for single-lens reflex cameras according to claim 20, which further conforms to the following condition (6)':

$$-0.66<SF2<0.6 \qquad (6)'.$$

25. The diopter movement type of finder optical system for single-lens reflex cameras according to claim 21, which further conforms to the following condition (7)':

$$-0.6<SF3<0.4 \qquad (7)'.$$

26. The diopter movement type of finder optical system for single-lens reflex cameras according to claim 19, which further conforms to the following condition (6):

$$-0.7<SF2<0.6 \qquad (6)$$

wherein SF2 is the shape factor defined by $$SF=(RE+RS)/(RE-RS)$$

where RE is the radius of curvature of the surface of the second lens located on the side of the eye point EP, and RS is the radius of curvature of the surface of the second lens located on the finder screen side.

27. The diopter movement type of finder optical system for single-lens reflex cameras according to claim 19, which further conforms to the following condition (7):

$$-0.8<SF3<0.8 \qquad (7)$$

wherein SF3 is the shape factor defined by $$SF=(RE+RS)/(RE-RS)$$

where RE is the radius of curvature of the surface of the third lens located on the side of the eye point EP, and RS is the radius of curvature of the surface of the third lens located on the finder screen side.

28. The diopter movement type of finder optical system for single-lens reflex cameras according to claim 20, which further conforms to the following condition (7):

$$-0.8<SF3<0.8 \qquad (7)$$

wherein SF3 is the shape factor defined by $$SF=(RE+RS)/(RE-RS)$$

where RE is the radius of curvature of the surface of the third lens located on the side of the eye point EP, and RS is the radius of curvature of the surface of the third lens located on the finder screen side.

* * * * *